May 25, 1926.
H. W. UHLENKOTT
SAW SET
Filed August 13, 1925
1,586,134
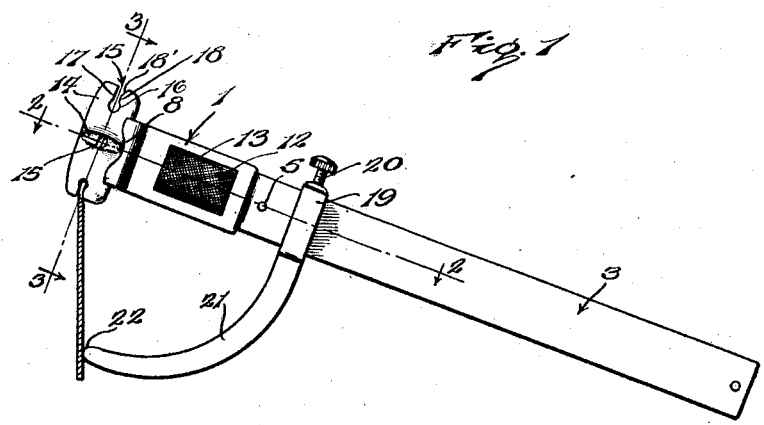
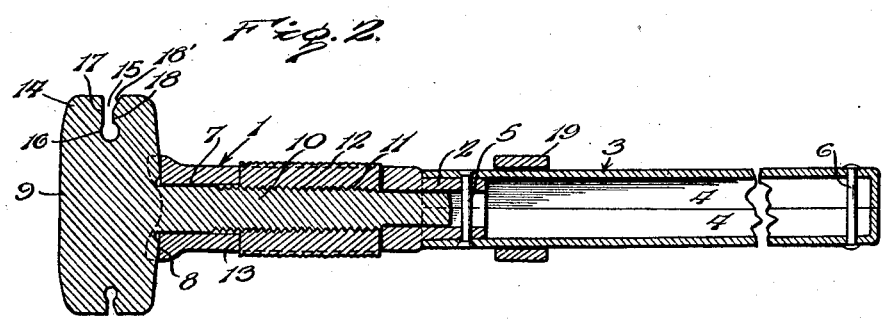
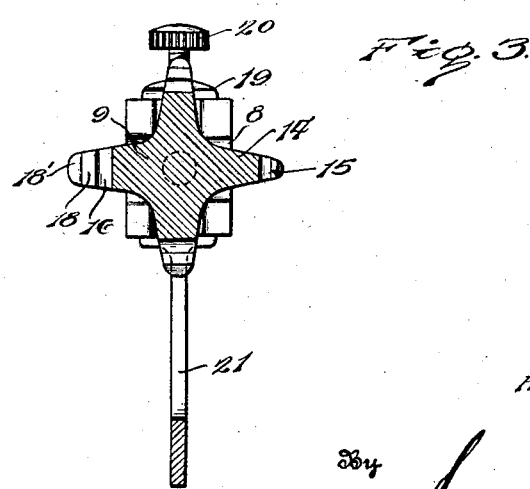
Inventor
H. W. Uhlenkott
By Lacy & Lacy, Attorney Patented May 25, 1926.

1,586,134

UNITED STATES PATENT OFFICE.

HERMAN W. UHLENKOTT, OF FERDINAND, IDAHO.

SAW SET.

Application filed August 13, 1925. Serial No. 50,115.

This invention relates to improvements in saw sets.

One of the objects of the invention is to provide a saw set which, by a simple adjustment of its parts, may be adapted for employment in setting the teeth of saws of various sizes and kinds.

Another object of the invention is to provide a saw set including a rotatably adjustable head having a number of outstanding bosses of different thicknesses and formed with notches of different widths and depths to accommodate saw teeth of various sizes, in combination with a gauge member carried by the stock of the tool to engage the side of a saw, the teeth of which are to be set, and insure of uniform setting of the teeth, the rotative adjustment of the head serving to bring any desired one of the bosses into position at that side of the tool at which the gauge is located, and, therefore, in position for use.

Another object of the invention is to so form the notches in the bosses of the head that the teeth will be more accurately set than is ordinarily possible with the use of a saw set of the usual construction.

In the accompanying drawings:

Figure 1 is a view in side elevation of the saw set embodying the invention applied to a saw blade.

Figure 2 is a detail longitudinal sectional view on the line 2—2 of Figure 1, looking in the direction indicated by the arrows.

Figure 3 is a detail sectional view taken substantially on the line 3—3 of Figure 1, looking in the direction indicated by the arrows.

The tool embodying the invention comprises a stock 1 having a relatively short rectangular tang 2 which is fitted into one end of the handle of the tool, which is indicated by the numeral 3, the said handle 3 comprising stamped metal sections 4 which are hollow and which have their open sides disposed in contact, the said sections being secured together and to the stock 1 by a rivet 5 which is secured through the sections and through the tang 2 of the stock, and being likewise secured together by a rivet 6 located near the outer end of the handle. This produces a structure which is relatively light in weight and yet substantial.

The stock 1 is formed axially with a bore 7 and, at its outer end, is formed with a plurality of transversely concave seats 8 which are radial to the axis of the bore 7, and in the illustrated embodiment of the invention these seats are four in number. The head of the tool is indicated by the numeral 9, and said head is provided with a stem 10 which extends axially therefrom and which seats in the bore 7 and is capable of rotative adjustment in said bore. The stem 10 is threaded, as indicated by the numeral 11, and a milled sleeve nut 12 is fitted upon the threaded portion of the stem and is confined between the opposite end walls of a recess 13 formed in the stock 1 and opening through opposite faces thereof, the sleeve nut being of such diameter that it will project at opposite sides a slight distance beyond the corresponding faces of the stock so that it may be conveniently rotated to effect longitudinal adjustment of the stem 10 in the bore 7. The head 9 is provided with a plurality of radial bosses, in the present instance, four in number, which bosses are disposed at right angles to one another in planes intersecting the axis of the head 9. These bosses, which are indicated by the numeral 14, are of different thicknesses, and each boss is formed with a notch 15 opening through its outer end and designed to accommodate the saw tooth to be set. It will be observed by reference to Figure 3 of the drawings, that, inasmuch as the bosses are of different thicknesses, the notches which are formed in the different bosses will likewise be of correspondingly different widths, and, furthermore, the notches in the different bosses are deeper in proportion to the increase in thickness of the bosses, so that the notch in the thinnest boss is relatively shallow, whereas the notch in the thickest boss is relatively deep. Likewise, the walls of the notches are spaced apart a less distance in the thinner bosses than in the thicker bosses, and the proportions of the notches are thus varied so that the notches may accommodate saw teeth of various sizes. Each notch, at its inner end, is somewhat enlarged, as indicated by the numeral 16, so that the point of the saw tooth which is being set will not be dulled through contact with the walls of the notch. It will be observed by reference to Figures 1 and 2 of the drawings, that one wall of each of the notches 15, which wall is indicated by the numeral 17, extends at right angles with relation to the axis of the head 9, whereas the opposite wall has its inner portion 18 extending parallel to the wall 17 and its outer portion 18' occupies a plane diverging from the plane of the wall 17 in the direction of the outer end of the notch. The purpose of thus forming the notches will presently be explained.

It will be observed by reference to Figures 2 and 3, that the inner edges of the bosses 14 are designed to engage in the seats 8 in the stock 1, and it will be evident that by rotating the sleeve nut 12 in one direction, the stem 10 will be fed outwardly, thereby disengaging the inner edges of the bosses from the seats 8, whereupon the head 9 may be rotated so as to bring any desired one of the bosses into position projecting beyond one side of the stock of the tool, whereupon the sleeve nut may be again rotated in the opposite direction so as to feed the stem 10 inwardly and cause the inner edges of the bosses to firmly seat in the seats 8, at which time the head 9 will be securely held against rotation and in the desired position of adjustment.

The gauge member of the tool comprises a substantially rectangular yoke 19 which is slidably adjustably fitted upon the handle 3 and adapted to be secured in positions of adjustment by means of a set screw 20 threaded through one side thereof and adapted, when tightened to bear against the corresponding side of the handle. A gauge arm 21 of arcuate form extends from the opposite side of the yoke 19 and is so curved that its engaging end 22 will be presented substantially in the line of extent of the axis of the tool.

In the use of the saw set, the sleeve nut 12 is rotated to feed the stem 10 outwardly, and the head 9 is then rotatively adjusted so as to bring that one of the bosses 14 in which the notch 15 of the proper size to accommodate the teeth of the saw to be set, will be presented at that side of the stock of the tool at which the arm 21 extends. The nut 12 is then rotated in the opposite direction to secure the head 9 in its position of adjustment, and the tool is employed in the usual manner by engaging the notched boss with successive ones of the teeth of the saw blade and pressing downwardly upon the handle of the tool until the engaging end 22 of the gauge arm 21 strikes the blade of the saw, at which time the tooth will be properly set.

It will be evident that the wall 17 of the notch which is in position to accommodate the tooth to be set, engages one side of the tooth to hold the tooth firmly while the tooth is being set, the portion 18 of the opposite wall engaging the other side of the tooth, and the portion 18' of the last mentioned wall being so inclined as to provide for proper angular bending of the end of the tooth.

Having thus described the invention, what I claim is:

1. A saw set comprising a stock having a longitudinal bore therein, a head having a threaded stem rotatably adjustably fitted in the bore, a sleeve nut fitting the said stem and rotatable in the stock, the end of the stock having seats therein radial to the bore, the head having radial bosses engaging at their inner edges in the seats, and a gauge member extending opposite one side of the stock, the bosses being of different thicknesses and having saw tooth receiving notches in their outer edges.

2. A saw set comprising a stock having a longitudinal bore therein, a head having a threaded stem rotatably adjustably fitted in the bore, a feed nut fitting the said stem and rotatable in the stock, the end of the stock having seats therein radial to the bore, the head having radial bosses engaging at their inner edges in the seats, and a gauge member extending opposite one side of the stock, the bosses being of different thicknesses and each boss having a saw tooth receiving notch in its outer edge, the notches in the different bosses having their walls spaced apart a greater or less distance in accordance with the variation in thickness of the bosses, whereby the notches of the different bosses will be adapted to accommodate saw teeth of different widths and thicknesses.

3. A saw set comprising a stock having a longitudinal bore therein, a head having a threaded stem rotatably adjustably fitted in the bore, a feed nut fitting the said stem and rotatable in the stock, the end of the stock having seats therein radial to the bore, the head having radial bosses engaging at their inner edges in the seats whereby when the nut is rotated in one direction, the head will be held in positions of rotative adjustment, and a gauge member extending opposite one side of the stock, the bosses being of different thicknesses and each having a saw tooth engaging notch in its outer edge, the walls of the notches in the different bosses being spaced apart a greater or less distance in accordance with the variation in thickness of the bosses, the outer wall of each notch extending at right angles to the axis of the head and the inner wall of each notch having a portion extending at an angle with relation to the first mentioned wall and diverging therefrom in the direction of the outer edge of the respective boss.

In testimony whereof I affix my signature.

HERMAN W. UHLENKOTT. [L. S.]